United States Patent [19]

Childs et al.

[11] 4,281,293

[45] Jul. 28, 1981

[54] PLANAR QPSK DEMODULATOR

[75] Inventors: William H. Childs, Gaithersburg, Md.; Christoph E. Mahle, Washington, D.C.

[73] Assignee: Communications Satellite Corporation, Washington, D.C.

[21] Appl. No.: 51,297

[22] Filed: Jun. 22, 1979

[51] Int. Cl.³ .......................................... H04L 27/22
[52] U.S. Cl. ................................. 329/105; 329/112; 329/116; 329/137; 329/204; 333/116; 375/84; 455/327
[58] Field of Search ............... 329/104, 105, 110, 112, 329/116, 137, 145, 204, 205 R, 50; 375/83, 84; 455/325–327; 333/116

[56] References Cited

U.S. PATENT DOCUMENTS 4,027,265  5/1977  Kobayashi et al. ............... 329/104 X

FOREIGN PATENT DOCUMENTS 2608939  9/1977  Fed. Rep. of Germany ........... 455/327

OTHER PUBLICATIONS

Childs et al., "A 3-dB Interdigitated Coupler on Fused Silica", IEEE MTT-s International Microwave Symposium Digest, 1977, pp. 370–372.

Cochrane et al., "Thin-Film Mixers Team Up to Block Out Image Noise", Microwaves, Mar. 1977, pp. 34–40.

Kurpis et al., "Wideband X-BAnd Microstrip Image Rejection Balanced Mixer", IEEE MTT Symposium Digest, 1970, pp. 200–205.

Wilkinson, "An N-Way Hybrid Power Divider," IRE Transactions MTT, Jan. 1960, pp. 116–118.

Primary Examiner—Siegfried H. Grimm
Attorney, Agent, or Firm—Sughrue, Rothwell, Mion, Zinn and Macpeak

[57] ABSTRACT

A microwave integrated circuit (MIC) quadrature phase shift keying (QPSK) demodulator uses a novel arrangement of couplers to permit the IF ports to be adjacent one another so that, in mixer applications, it is unnecessary for the circuitry to leave the plane of the MIC. A symmetrical arrangement of the MIC ensures near-perfect phase orthogonality of the RF₂ split and the power/phase identity of the RF₁ split.

5 Claims, 8 Drawing Figures

MIC IMPLEMENTATION OF THE PLANAR QPSK DEMODULATOR

PLANAR QPSK DEMODULATOR

BACKGROUND OF THE INVENTION

A number of different modulation techniques are commonly used in modern digital communication systems, one of which is known as phase/shift keying (PSK) in which digital information is transmitted as the sequential transmission of carrier pulses of constant amplitude, angular frequency and duration, but of different relative phase. Two common types are differential quadrature phase shift keying (DQPSK) in which information is represented by the phase transitions between carrier pulses, and coherent quadrature phase shift keying (CQPSK) in which a phase reference is provided in the receiver so that the receiver may be phase-synchronized with the transmitter and information may be represented by the amplitude phase of each pulse. Each of these modulation systems is well known in the art and need not be described in further detail herein.

In a QPSK demodulator, there must be two RF inputs and two IF outputs. FIG. 1 is a brief diagram of a basic QPSK phase detector. The phase detector includes two RF input ports 10 and 12, an in-phase power splitter 14, a 90° 3 dB hybrid coupler 16 and two mixers 18 and 20. The $IF_1$ and $IF_2$ outputs of the mixers 18 and 20, respectively, will be at the same frequency, which frequency will be equal to the difference between the frequencies of $RF_2$ and $RF_1$. For CQPSK or DQPSK, $RF_1$ and $RF_2$ will have the same frequency with $RF_2$ being used as a phase reference signal for the modulated carrier $RF_1$. $RF_1$ will be split by the in-phase power splitter 14 and supplied as one input to each of the mixers 18 and 20. The $RF_2$ signal, however, will be supplied through the coupler 16 and, as is well known in the art, the inputs supplied from the coupler 16 to the mixers 18 and 20 will be 90° out-of-phase. The result will be two orthogonal bit streams $IF_1$ and $IF_2$ from which the original information can be recovered.

In mixer applications, $IF_1$ and $IF_2$ will typically be combined in a 90° 3 dB hydrid coupler so that the upper (signal) and lower (image) sidebands can be physically separated without the use of filters. Such a configuration is shown in FIG. 2 in which the IF outputs of mixers 18 and 20 are combined in a coupler 22. In both FIGS. 1 and 2, it can be seen that the RF inputs are separated by IF outputs, and vice versa. Thus, in order to combine the IF outputs in a coupler such as shown in FIG. 2, at least one of the IF signal paths must cross the path of the signal $RF_2$ supplied to the phase detector input 12. In some circuit applications, this requirement may result in a significant disadvantage.

In many applications, the QPSK demodulator will be formed as a microwave integrated circuit (MIC). In fabricating such circuits, it would be desirable from the point of view of manufacturing ease and circuit reliability to form the entire MIC in a single plane. However, if the IF outputs are to be combined in a coupler, the RF-IF-RF-IF arrangement of the input and output ports will require that at least one signal, usually one of the IF signals, leave the plane of the MIC assembly. This will require the use of holes, connectors, cables, vias, or some combination thereof. Not only does this result in difficulties in circuit fabrication, but it may detract from the circuit performance at very high frequencies. G. P. Kurpis and J. J. Taub, "Wideband X-band Microstrip Image Rejection Balance Mixer", IEEE, MTT Symposium Digest 1970, pp. 200–205, describes a typical image rejection receiver in which both $IF_1$ and $IF_2$ are routed to the underside of the MIC assembly for processing by the 90° hybrid at IF. J. B. Cochrane and F. A. Marki, "Thin-film Mixers Team Up To Block Out Image Noise", Microwaves, March, 1977, pp. 34–40, later describe a receiver in which double-sided MIC's are used to obtain physical separation of the upper and lower side bands.

SUMMARY OF THE INVENTION

It is an object of this invention to provide a QPSK demodulator in which there is no need for a RF-IF crossover.

It is a further object of this invention to provide such a demodulator which can be constructed in MIC form without the need for holes, connectors, cables or vias.

It is a still further object of this invention to provide a QPSK demodulator in which the RF ports are adjacent one another and in which the IF ports are adjacent one another and in which there is no need for any of the RF and IF signals to leave the plane of the assembly.

These and other objects are achieved according to the present invention by providing RF input ports which are adjacent one another and processing the RF signals through a novel arrangement of 90°, 3 dB couplers so that the IF output ports can be adjacent one another. All of the necessary signal crossing is done on the RF side of the system and, therefore, there is no need for any of the signals to leave the plane of the MIC assembly. In the preferred embodiment, the $RF_1$ signal is supplied to an in-phase power splitter, one output of which is provided as an input to a first 90°, 3 dB coupler, the other input to which is the $RF_2$ signal. The outputs of the first coupler are used as inputs to a second identical coupler, one output of which is provided as a RF input to a first mixer. The other output of the power splitter is fed as one input to a 90°, 3 dB coupler, the other to which is connected to a resistive termination so that it acts as a power splitter. The outputs of this third 90° 3 dB coupler are then used as inputs to a fourth 90° 3 dB coupler, one output of the fourth coupler being used as a $RF_1$ input to a second mixer. The other outputs of the second and fourth mixers are supplied as inputs to a fifth 90° 3 dB coupler, the outputs of which are the phase-orthoganal $RF_2$ inputs to each of the first and second mixers. The first through fourth couplers are preferably identical and the fifth coupler is preferably a branch line coupler so that a line of symmetry may be maintained between the mixers. This will enhance the phase orthogonality of the $RF_2$ split and the power/phase identity of the $RF_1$ split.

BRIEF DESCRIPTION OF THE DRAWINGS

The present invention will be more clearly understood with reference to the following description in conjunction with the accompanying drawings in which.

DETAILED DESCRIPTION OF THE INVENTION

Figure 1:
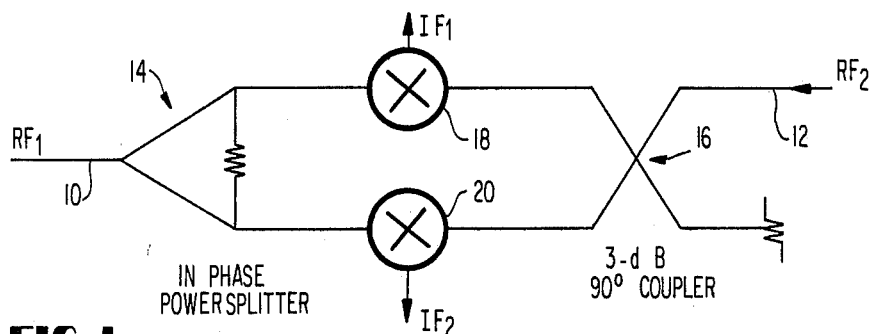
FIG. 1 is a diagram illustrating a conventional QPSK phase detector.
Figure 2:
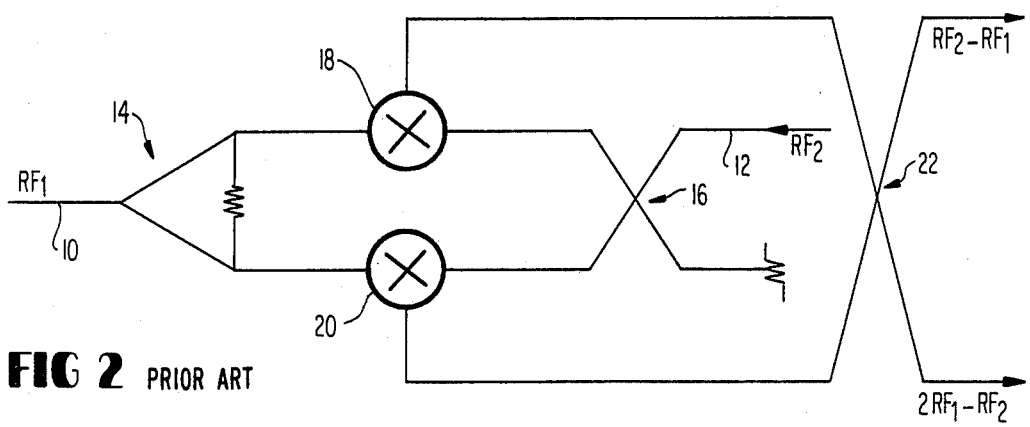
FIG. 2 is a diagram illustrating an image separation mixer application of the phase detector of FIG. 1.
Figure 3:
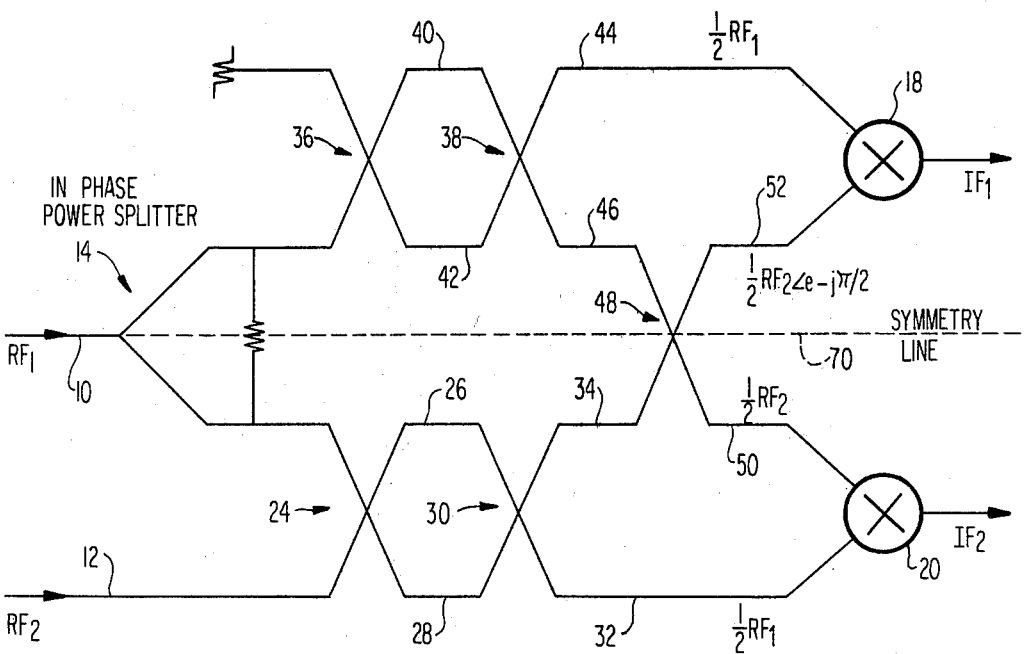
FIG. 3 is a diagram of a planar QPSK demodulator according to the present invention.

FIG. 3 is a schematic diagram of a QPSK demodulator according to the present invention. The input ports 10 and 12 are adjacent one another with the input signal $RF_1$ at input 10 being supplied to an in-phase power splitter 14 identical to those shown in FIGS. 1 and 2. The in-phase power splitter 14 is preferably a MIC realization of a Wilkinson divider disclosed by E. J. Wilkinson, "An N-way Hybrid Power Divider", I.R.E. Transactions MTT, January, 1960, pp. 116–118. One output of the power splitter 14 is provided as an input to a 90°-3 dB coupler 24, the other input to which is the $RF_2$ signal. The coupler 24 should be of the interdigitated type disclosed by W. H. Childs and P. A. Carlton, "A 3 dB Interdigitated Coupler on Fused Silica", 1977 IEEE Microwave Theory and Techniques (MTT) Symposium Digest, pp. 370–372. This is similar to the interdigitated coupler described in U.S. Pat. No. 3,516,024 to Lange.

As is known in the art, the output signal of the coupler 24 on line 26 will include a portion of $RF_1$ as well as a portion of $RF_2$ shifted by 90° in phase. Similarly, the signal on line 28 will include a portion of $RF_2$ as well as a 90° phase-shifted portion of $RF_1$. These are supplied as inputs to a second coupler 30 which is identical to the coupler 24 and provides at its output line 32 a portion of the signal on line 28 plus a 90° phase-shifted portion of the signal on line 26. The $RF_2$ portion from line 26 will thus undergo a second 90° phase-shift and will be 180° out-of-phase with the $RF_2$ portion from line 28. The result will be only a $RF_1$ signal existing at line 32 as an input to the mixer 20. The $RF_1$ signal at the input to mixer 20 will have some phase shift with respect to the original $RF_1$ signal at input port 10. In a similar manner, the signal on line 34 will constitute only $RF_2$ and will have the same phase shift with respect to the original $RF_2$ signal on input port 12.

The couplers 36 and 38 on the other side of the demodulator are identical to and operate in the same fashion as the couplers 24 and 30 already described. On this second side of the demodulator, however, there is no $RF_2$ input to the coupler 36. Accordingly, (½) of the $RF_1$ power will appear on line 42 in its original phase, and a similar quantity of $RF_1$ power will appear on line 40 phase-shifted by 90°. The signal on line 42 will then be shifted in phase by 90° before appearing at line 44 where it will be combined with a portion of the signal on line 40 to result in the original $RF_1$ signal phase-shifted by 90°. The signals at lines 40 and 42 will be 180° out-of-phase when they appear at line 46 and, therefore, will cancel one another. Since there is no input on line 46 to the final coupler 48, the signal on line 50 will merely be a portion of that on line 34 and the signal on line 52 will be identical to that on line 50 but shifted in phase by 90°.

It is noted that the $RF_1$ inputs to the mixers 18 and 20 will have some phase-shift with respect to the original $RF_1$ input signal at port 10. However, the $RF_2$ inputs to the mixer 20 on line 50 will have the same phase-shift with respect to the original $RF_2$ signal at port 12 and the $RF_2$ input on line 52 will have an additional 90° phase-shift and, therefore, the phase relationships between the mixer inputs are the same as those in the conventional phase detector shown in FIG. 1.

Figure 4:
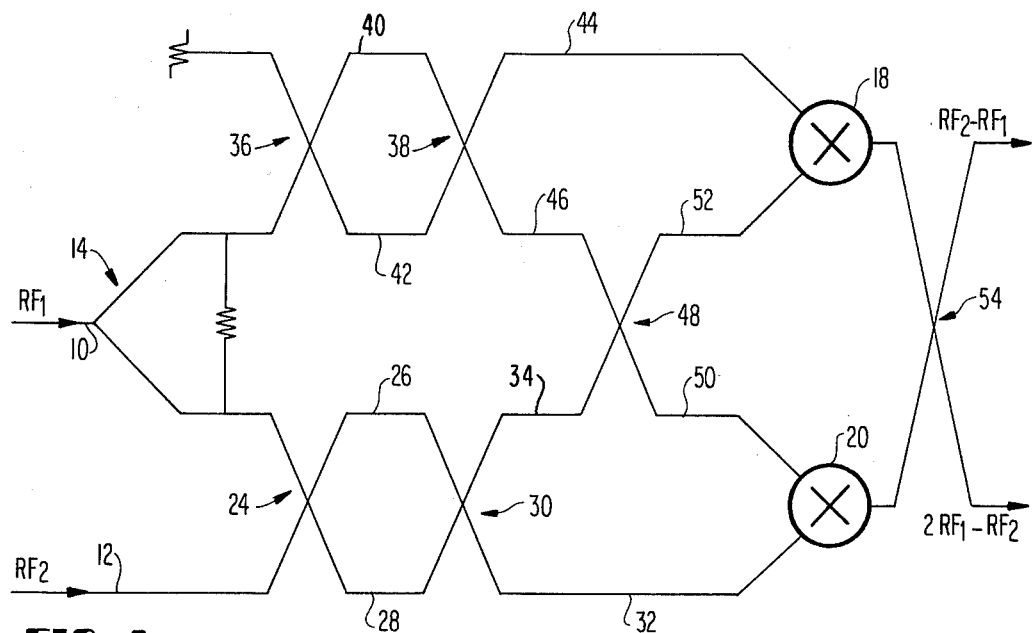
FIG. 4 is a diagram of an image separation mixer application of the planar QPSK demodulator of FIG. 3.

The RF crossover accomplished by the cascade of 3 dB couplers permits the IF signals to be combined without the necessity of crossing over the RF paths. This will be a significant advantage in the fabrication of an image separation mixer since the IF signals can be supplied as inputs to the mixer without ever having to leave the plane of the MIC. A schematic diagram of an image separation mixer utilizing the QPSK demodulator according to the present invention is shown in FIG. 4 which is identical to FIG. 3 with the exception of the additional 3 dB 90° coupler 54 which separates the signal and image side bands from the orthogonal bit streams at the outputs of each of the mixers 18 and 20.

Figure 5:
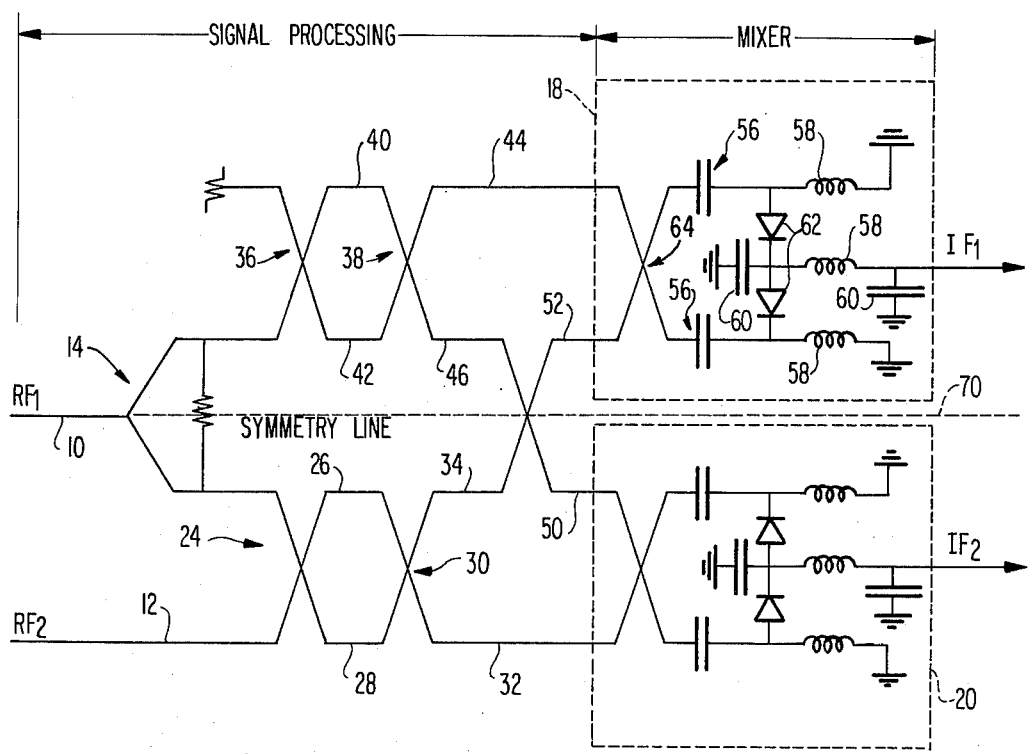
FIG. 5 is a diagram illustrating a particular mixer implementation of the image separation mixer of FIG. 3.

The individual mixers 18 and 20 can be realized in a number of ways. A singly-balanced implementation is shown in FIG. 5 and is particularly suitable for single-sided planar geometry. Each of the mixers includes blocking capacitors 56, series inductors 58, shunt capacitors 60, diodes 62 and a 3 dB 90° coupler 64.

Figure 6:
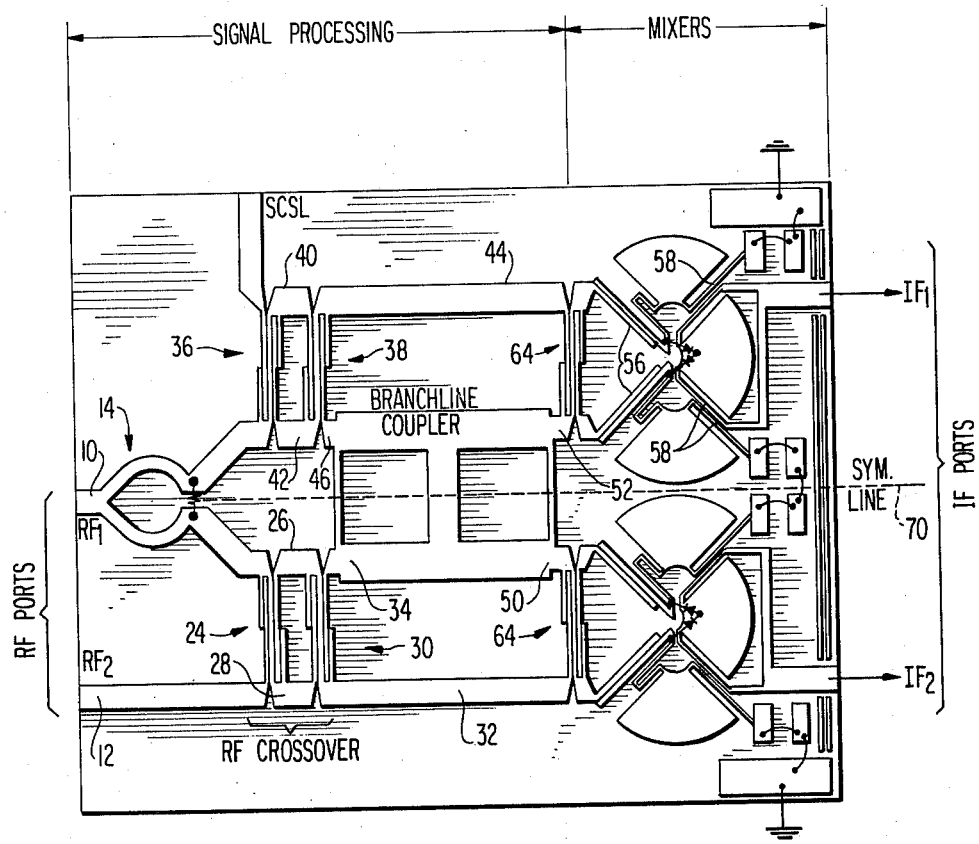
FIG. 6 is a plan view of a MIC implementation of the mixer shown in FIG. 5.

A MIC implementation of the planar QPSK demodulator according to the present invention is shown in FIG. 6. This circuit design is intended for use in the 14.0–14.5 GHZ band but functions properly over a wide frequency range of 11–17 GHz. The circuit is constructed on fused silica with dimensions of approximately 1.0×0.8×0.015 inches. The RF crossover 3 dB 90° couplers 24, 30, 36, 38 and 64 are all of the above-described interdigitated type while the in-phase power splitter 14 is a MIC realization of a Wilkinson divider. The blocking capacitors are realized with a section of edge-coupled transmission lines with a center frequency at 14.25 GHz. The shunt capacitors are realized by radial transmission lines resonant at 14.25 GHz. The series inductors 58 are formed by high impedance transmission lines. The diodes 62 are preferably Schottky barrier diodes of the beam lead type, e.g., Hewlett-Packard 5082-2510.

The circuit of FIG. 6 can be constructed using standard photolithographic techniques and the diodes can then be attached and the adjacent fingers of the interdigitated couplers wire bonded. The circuit is entirely free of holes, capacitors, vias or any other undesirable features, and the back of the circuit is a simple ground plane. Thus, a two dimensional realization of a QPSK demodulator is achieved by a single-sided MIC with simple strap or wire bond connections. The construction techniques are extremely simple and, thus, manufacturing ease and circuit reliability are considerably enhanced.

As shown in FIGS. 3, 5 and 6, a line of symmetry 70 is maintained between the mixers along the length of the demodulator. This symmetrical construction of the demodulator will contribute to the proper phase relationships at the inputs of each of mixers 18 and 20. Interdigitated couplers of the type used at 24, 30, 36 and 38 are not symmetrical in construction. Thus, in order to preserve the line of symmetry, the 3 dB 90° coupler 48 which separates the $RF_2$ is preferably a branch line coupler of the type well-known in the art. The phase orthogonality of the RF$_2$ split and the power/phase identity of the RF$_1$ split are virtually perfect when this line of symmetry is maintained.

Since there are no holes, capacitors, plated holes, feedthroughs, or other limiting features in the IF lines, and since Schottky barrier diodes do not suffer from minority carrier recommutations limitations, the IF band width is thought to be limited by the RF band width of the circuit. 120 MBs operation has been readily demonstrated and, as indicated earlier, the RF band width of the particular circuit illustrated in FIG. 6 extends from 11 to 17 GHz. Thus, the demodulator according to the present invention not only provides a topology which is more easily and more reliably fabricated, but achieves significant improvements in operating speeds with respect to conventional QPSK demodulators.

Figure 7:
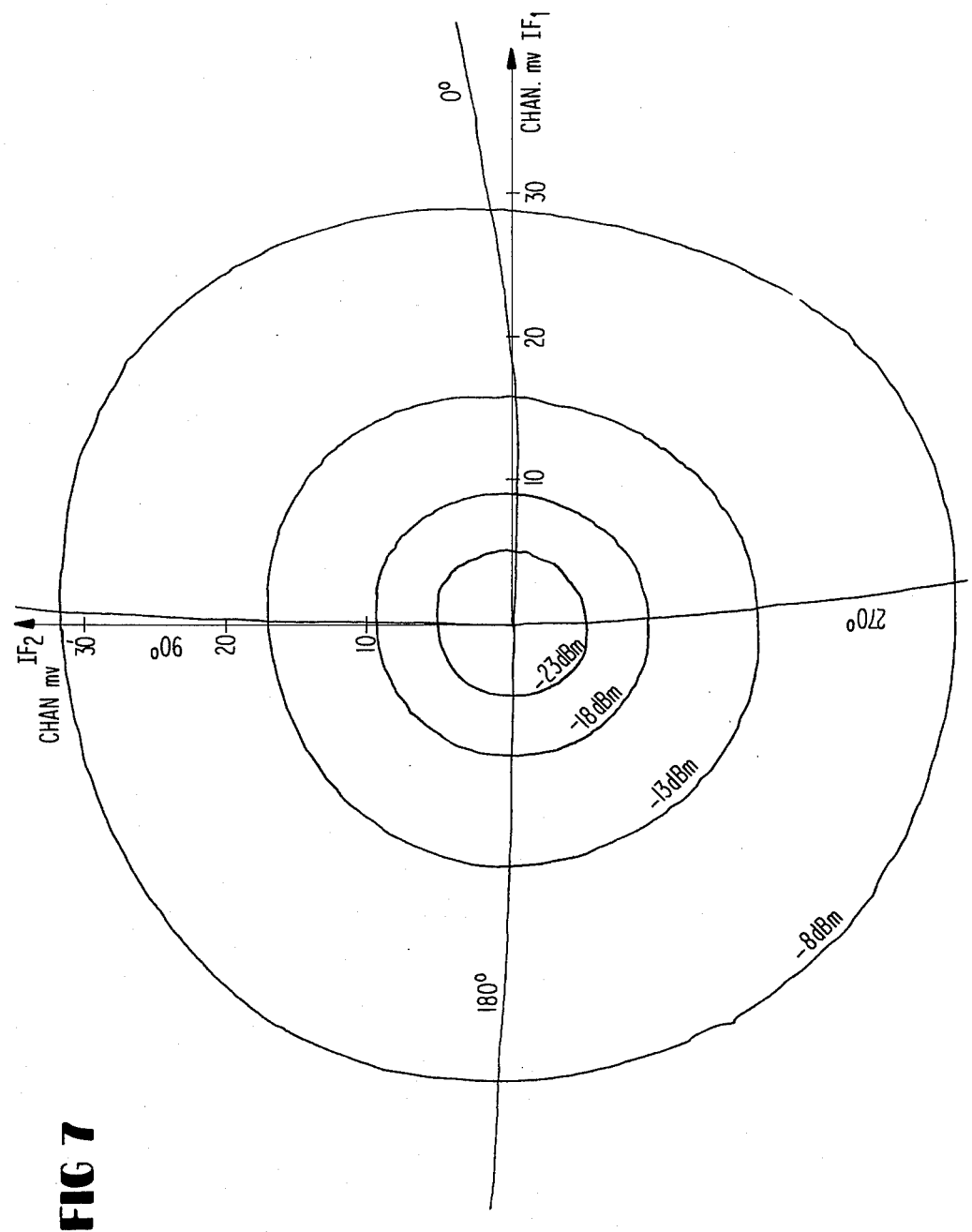
FIG. 7 is a graph of the P and Q channel orthogonality of the planar QPSK demodulator shown in FIG. 4.

FIG. 7 is a graph of the IF$_1$ and IF$_2$ channel orthogonality of the planar QPSK demodulator illustrated in FIG. 6. The data illustrated in FIG. 7 was obtained by statically varying the RF phase difference through 360°. Orthogonality appears to distort at higher power levels, but it can be seen that the orthogonality is very good regardless of the phase difference between the RF inputs.

Figure 8:
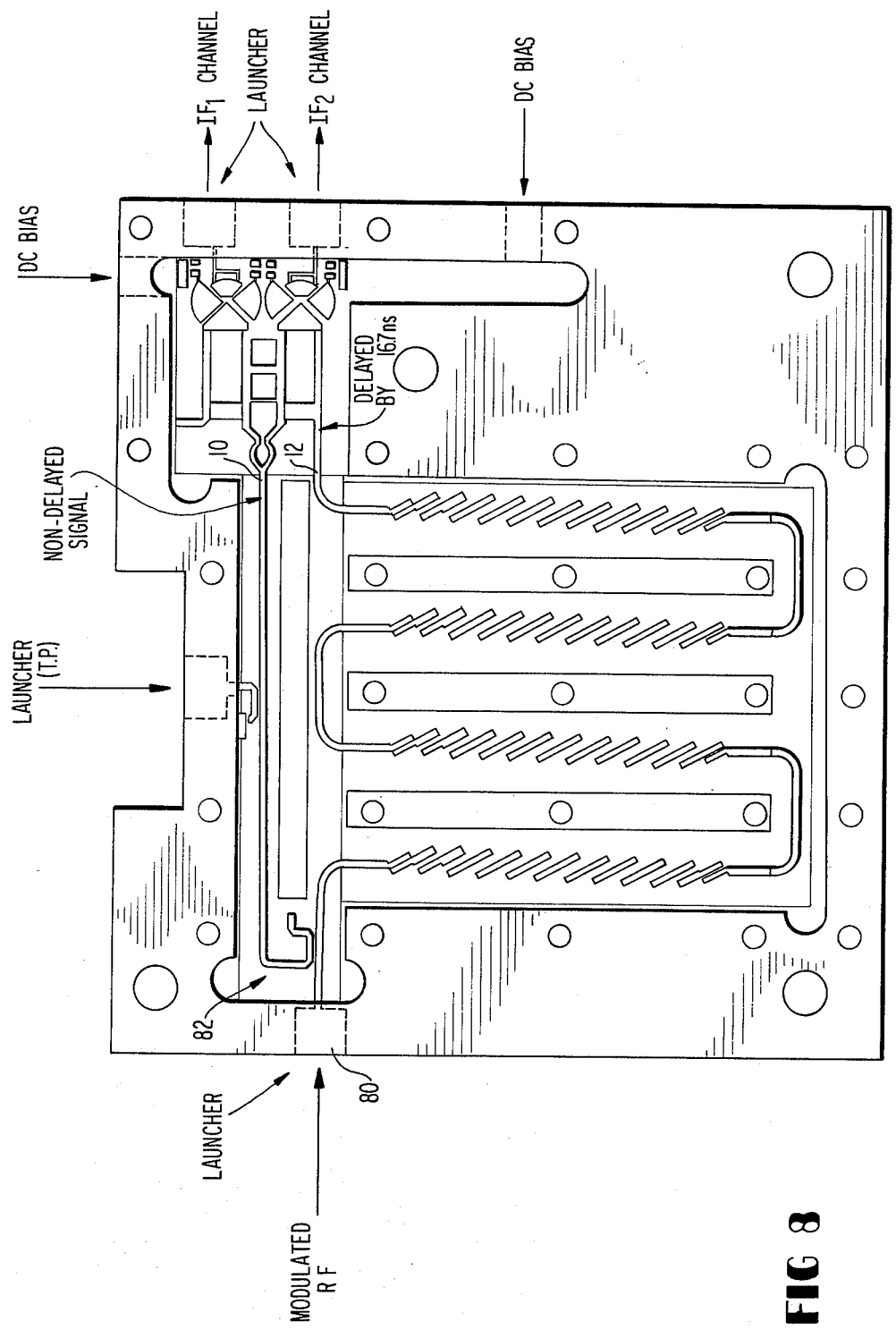
FIG. 8 is a plan view of a MIC DQPSK demodulator utilizing the planar QPSK demodulator circuitry according to the present invention.

FIG. 8 is a plan view of a DQPSK demodulator utilizing the principles of the present invention. As described above, DQPSK demodulation is accomplished by comparing the phases of successive bits in the received RF signal. Accordingly, the modulated RF signal is provided to the input port 80 and is separated in a coupler 82. A non-delayed RF input signal is provided to the demodulator input port 10, while the same modulated RF input signal delayed by approximately 16.7 ns is supplied to the demodulator input port 12. The entire assembly can be achieved in a simple 2-dimensional MIC realization, since the modulator topology according to the present invention permits the RF ports as well as the IF ports to be adjacent one another.

What is claimed is:

1. A QPSK demodulator of the type having RF$_1$ and RF$_2$ input ports for receiving RF$_1$ and RF$_2$ input signals respectively, and IF$_1$ and IF$_2$ output ports for providing IF$_1$ and IF$_2$ output signals, respectively, power dividing means connected to said RF$_1$ input port and supplying a RF$_1$ input signal to each of first and second mixers, coupling means coupled to said RF$_2$ input port for providing RF$_2$ inputs to each of said first and second mixers, said RF$_2$ inputs to said first and second mixers being 90° out-of-phase with respect to one another, said first and second mixers providing said IF$_1$ and IF$_2$ output signals, respectively, the improvement comprising:
said RF$_1$ and RF$_2$ input ports being adjacent one another and said IF$_1$ and IF$_2$ output ports being adjacent one another without the necessity of any IF-RF signal path crossovers in said demodulator.

2. A QPSK demodulator as defined in claim 1, wherein the improvement is further characterized in that said demodulator is a MIC in which none of the RF and IF signal paths leave the plane of the MIC.

3. A QPSK demodulator as defined in claims 1 or 2 wherein the demodulator is substantially symmetrical about a line of symmetry passing between said first and second mixers.

4. A QPSK demodulator as defined in claim 3, wherein said dividing means is a power divider which receives said RF$_1$ input signal and provides first and second in-phase RF$_1$ output signals, the improvement further characterized in that said demodulator comprises:
a first coupler receiving as inputs said RF$_2$ input signal and the first RF$_1$ output signal from said power divider, and providing first and second output signals;
a second coupler receiving as inputs the first and second outputs of said first coupler and providing first and second output signals, said second coupler second output being provided as the RF$_1$ input to said second mixer;
a third coupler receiving the second output of said power divider as its first input and having its second input coupled to a resistive termination, said third coupler providing first and second output signals;
a fourth coupler receiving as inputs the first and second outputs of said third coupler and providing first and second output signals, the first output signal of said fourth coupler being supplied as the RF$_1$ input to said first mixer and having the same phase as the RF$_1$ input to said second mixer; and
a fifth coupler receiving the fourth coupler's second output as a first input and receiving the second coupler's first output as its second input and providing first and second RF$_2$ output signals phase-shifted by 90° with respect to one another, said first and second RF$_2$ output signals from said fifth coupler being provided as the RF$_2$ input signals to said first and second mixers.

5. A QPSK modulator as defined in claim 4 wherein said first through fourth couplers are interdigitated-type 3 dB, 90° couplers, and said fifth coupler is a branch line-type 3 dB 90° coupler.

* * * * *